Sept. 16, 1969 H. H. LEACH ETAL 3,467,919

APPARATUS FOR UNEQUAL POWER DIVISION
EXHIBITING HYBRID PROPERTIES
Filed Aug. 30, 1967

INVENTORS.
ANDREW ALFORD
HAROLD H. LEACH
BY
Wolf, Greenfield & Hieken
ATTORNEYS

United States Patent Office 3,467,919
Patented Sept. 16, 1969

3,467,919
APPARATUS FOR UNEQUAL POWER DIVISION EXHIBITING HYBRID PROPERTIES

Harold H. Leach and Andrew Alford, Winchester, Mass. 01890; said Leach assignor to said Alford Filed Aug. 30, 1967, Ser. No. 664,462
Int. Cl. H01p 5/12
U.S. Cl. 333—9 9 Claims

ABSTRACT OF THE DISCLOSURE

A series branch, parallel branch and side branches I and II of substantially the same characteristic impedance are coupled by respective transformers to a junction so arranged that energy applied to either the series branch or the parallel branch goes only to the side branches in a ratio proportional to the ratio of the impedances presented at the junction by the respective side branch transformers while maintaining the isolation between the series branch and the parallel branch. A specific structure representing a modification of the coaxial hybrid disclosed in Patent No. 2,769,146 includes longitudinal slots in an intermediate conductor that is coaxial with an outside conductor outside both the series branch inner conductor and the parallel branch inner conductor which slots are separated by an angle $\theta=360/(n1)$, where $n$ is the ratio of power division and which slots are electrically equidistant from each respective side branch while being physically closer to the side branch receiving the smaller amount of power.

BACKGROUND OF THE INVENTION

The present invention relates in general to unequal power division and more particularly concerns novel apparatus exhibiting hybrid properties for facilitating unequal power division into side branch loads of energy incident at either or both of series and parallel branches while maintaining substantial isolation between the series and parallel branches.

There are numerous hybrids available that facilitate equal energy division between side branches when energy is applied to the series and/or parallel branches while maintaining substantial isolation between the series and parallel branches. Examples of such apparatus include hybrids listed in Alford Manufacturing Company catalog L described on pages 64–67 and the R-F bridge networks described on pages 75–82. These apparatus typically have the property that when the four branches are terminated in their respective characteristic impedances, energy applied to one of the series and parallel branches divides equally between the side branches with essentially none reaching the other of the series and parallel branches. If unequal power division is desired, the conventional approach involves attenuating the energy withdrawn from one of the side branches. This is disadvantageous because power is wasted and an extra attenuating component required.

Accordingly, it is an important object of this invention to provide apparatus exhibiting both hybrid and unequal power division properties with exceptionally low insertion loss.

It is a further object of the invention to achieve the preceding object with four branches of substantially the same characteristic impedance.

It is still a further object of the invention to achieve the preceding objects with relatively little additional apparatus that is relatively easy to fabricate.

It is a further object of the invention to achieve the preceding objects over a relatively wide frequency range.

SUMMARY OF THE INVENTION

According to the invention, there is means defining a junction. First, second, third and fourth branches are coupled to the junction by first, second, third and fourth impedance transforming means that matches the impedance of a respective branch to that seen at the junction with the impedance presented to the junction by the second and third transformers being unequal. The appartus includes means for effectively essentially isolating the first and fourth branches. Typically, the first branch is a series branch that is effectively loaded by at least the series combination of the impedance presented to the junction by the second transformer and the impedance presented to the junction by the third means for transforming as transformed by the first means for transforming. Typically the fourth branch is a parallel branch that is effectively loaded by at least the impedance presented to the junction by the second means for transforming in parallel with the impedance presented to the junction by the third means for transforming as transformed by the fourth means for transforming.

In a specific form of the invention representing a modification of the coaxial hybrid described in Alford Patent No. 2,769,146, the series branch is coupled to the second and third means for transforming by the first means for transforming comprising a coaxial transminsion line having an inner conductor that is coaxial with a surrounding intermediate conductor for essentially a quarter wavelength and then coupled to the intermediate conductor essentially at the end of this quarter wavelength, preferably to a portion of the intermediate conductor that is midway between a pair of longitudinal slots that extend for most of the length of the intermediate conductor parallel to the coaxial transmission line axis and subtend an angle $\theta$ about the axis. The fourth means for transforming comprises the intermediate conductor functioning as the inner conductor of a fourth coaxial transmission line and an outer conductor coaxial about the axis of both the inner and intermediate conductors. The second and the third means for transforming comprise second and third coaxial transmission line impedance transforming sections respectively, having respective axes orthogonal to that of the inner conductor of the series coaxial transmission line. The respective inner conductors of the side branch coaxial transmission lines are coupled to the intermediate conductor a quarter wavelength away from the series and parallel branches and have a ratio of characteristic impedances proportional substantially to the square root of the desired ratio of power division between the two side branches.

Numerous features, objects and advantages of the invention will become apparent from the following specification when read in connection with the accompanying drawing in which:

DETAILED DESCRIPTION OF THE DRAWING

DETAILED DESCRIPTION OF THE PREFERRED EMBODIMENTS

Figure 1:
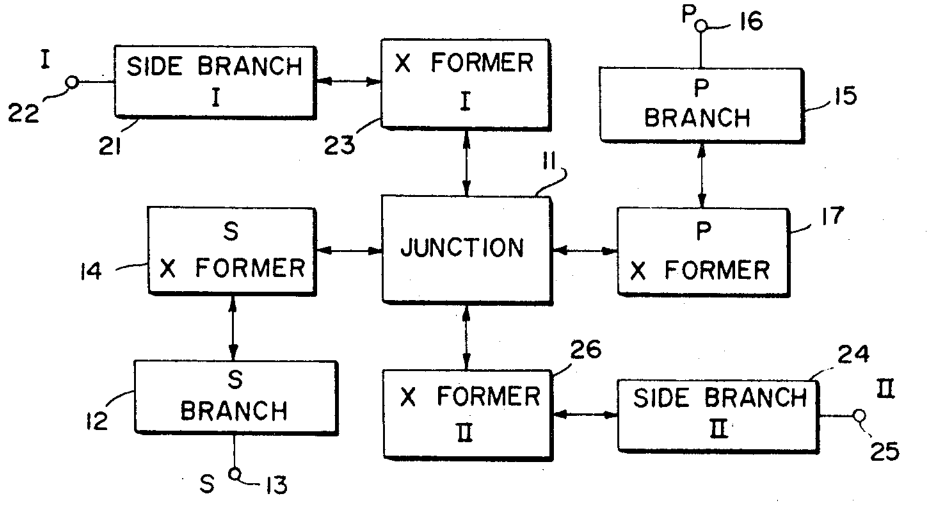
FIG. 1 is a block diagram illustrating the logical arrangement of unequal power dividing apparatus having hybrid properties according to the invention.

With reference now to the drawing and more particularly FIG. 1 thereof, there is shown a block diagram illustrating the logical arrangement of unequal power dividing apparatus having hybrid properties according to the invention. Energy is exchanged among the various branches through means including the junction 11. The S or series branch 12 includes an S input terminal 13 and is coupled to junction 11 by an S transformer 14. The P or parallel branch 15 includes a P input terminal 16 and is coupled to junction 11 by a P transformer 17. The first side branch 21 includes a I input terminal 22 and is coupled to junction 11 by transformer I23. A second side branch 24 includes an input terminal II25 and is coupled to junction 11 by a transformer II26. The respective transformers 14, 17, 23 and 26 transform the respective impedance each sees at junction 11 presented by the other transformers to that of the respective branches 12, 15, 21 and 24 respectively.

By way of example it is convenient to assume that it is desired to deliver four times as much power to side branch I than to side branch II and that each of the branches is terminated in its respective characteristic impedance of 50 ohms. This can be accomplished if junction 11 is presented with an impedance by transformer II26 that is four times the impedance presented by transformer I23. A convenient way for achieving this result is to have transformer II a stepup transformer and transformer I a stepdown transformer, the former presenting junction 11 with an impedance of 141 ohms while the latter presents junction 11 with an impedance of 35.35 ohms. These specific impedances are convenient when the branches have the common characteristic impedance of 50 ohms because transformer II26 and transformer I23 may be quarter-wave sections having characteristic impedances of 84.08 ohms and 42.04 ohms, respectively.

With the retention of the hybrid properties whereby the S branch 12 is essentially isolated from the P branch 15, the characteristic impedance of the S transformer 14 to match the series combination of the impedance presented by transformer I23 and that presented by transformer II26, or 35.35+141=176.35 ohms, is given by $$Z_{os}=\frac{nZ_{oI}}{\sqrt{n+1}}$$

where $n$ is the ratio of the power delivered to the side branch receiving more power to that delivered to the side branch receiving less power and $Z_{oI}$ is the characteristic impedance of the side branch transformer electrically farther from the series branch, conventionally branch I. S transformer 14 may then be a quarter wavelength transformer of characteristic impedance $$\frac{42.04(4)}{\sqrt{5}}$$

or 75.21 ohms.

With the retention of hybrid operation P transformer 17 is presented by junction 11 with the parallel combination of the impedance presented by transformer I23 and that presented by transformer II26, or the parallel combination of 35.35 and 141 ohms, or substantially 28.3 ohms, and typically has a characteristic impedance of 37.6 ohms. The general equation is $Z_{op}=\sqrt{nZ_{oI}}/\sqrt{n+1}$.

Although the principles of the invention may be embodied so long as the impedance transformers coupling the respective side branches have the ratio as set forth above, it will often be desirable to choose specific absolute values of these impedances to achieve certain practical advantages, such as attaining practical dimensions for all the transmission line portions. In addition, it has been discovered that specific absolute values seem to have an effect on the bandwidth over which effective isolation and good impedance match is attained. The specific values given by way of example above are representative of a specific embodiment believed to be optimum for a specific application. These specific values were determined by a cut-and-try process to determine what are believed optimum values.

The relationship of the characteristic impedances of the two transformers in the side arms of the proposed hybrid that they be in the ratio of $\sqrt{n}$ does not uniquely define their absolute values because there are an infinite number of such pairs. Many of the pairs would operate satisfactorily at a single frequency or very narrow band of frequencies.

However, if it is desired that a hybrid exhibit the properties according to the invention over a substantial range of frequencies, it is preferable to incorporate additional refinements. For example, it is known that a two stage quarter wavelength transformer will better match one impedance level to another over a broader range of frequencies than a single stage transformer. This better matching occurs if the levels of impedance change of the two stages are properly chosen because the dispersion vs. frequency introduced by one stage will approximately compensate the dispersion vs. frequency introduced by the other stage, thereby resulting in a better average match over a given range of frequencies.

For optimum operation over a substantial range of frequencies, the dispersion introduced by the two side arm transformers should approximately be compensated by the dispersion introduced by the P branch transformer. The problem is slightly more difficult to analyze than the conventional two stage transformer case because "one stage" of the hybrid transformers in the invention actually consists of two transformers in parallel. Furthermore, the junction of stages in the hybrid is shunted by a quarter wavelength short-circuited length of transmission line (ending at annular ring 34) which introduces a dispersion of its own.

One may calculate the dispersion vs. frequency of several different transformer ratios with the assistance of well known Smith chart techniques and of the several other elements making up the system to choose the best ratio which, in conjunction with the short-circuited shunting line length and the branch P transformer, results in the minimum net dispersion of impedance as seen at the branch P input over the frequency range of interest.

An especially convenient experimental approach might well involve the use of autotransformers in a low frequency range. The transformation ratios could be easily adjusted in the four branches until the desired isolation and VSWR over a prescribed ratio of frequency limits was obtained and these ratios used to determine the transformation ratio required of each quarter wavelength transformer at a higher operating frequency range of interest having the same ratio of frequency limits.

Other forms of transformers may be used, such as transformers having primary and secondary windings and autotransformers. Transmission line transformers are especially advantageous for many applications because of their low loss and ability to operate at exceptionally high frequencies.

Figure 2:
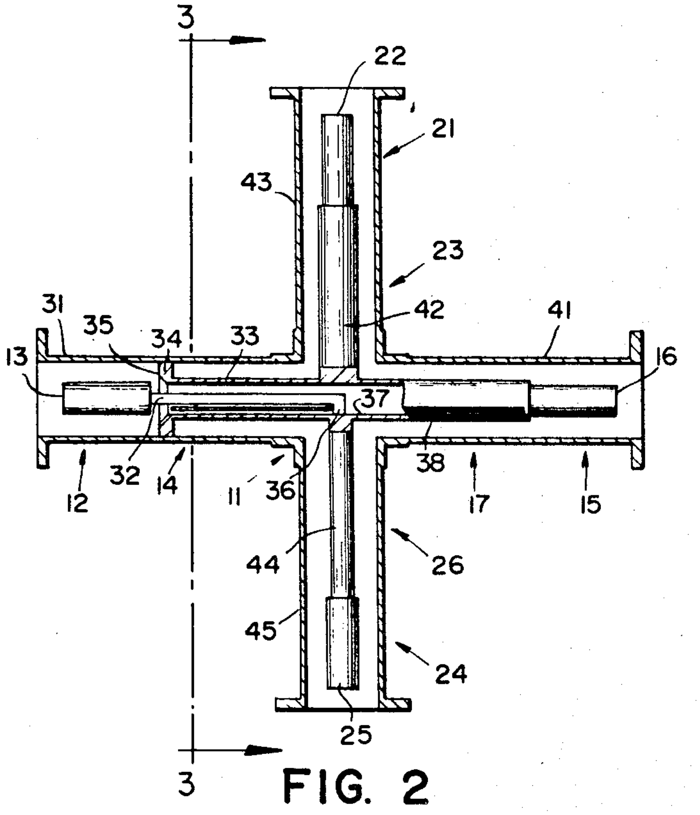
FIG. 2 is a view through section 2—2 of a coaxial embodiment of the invention of FIG. 3.
Figure 3:
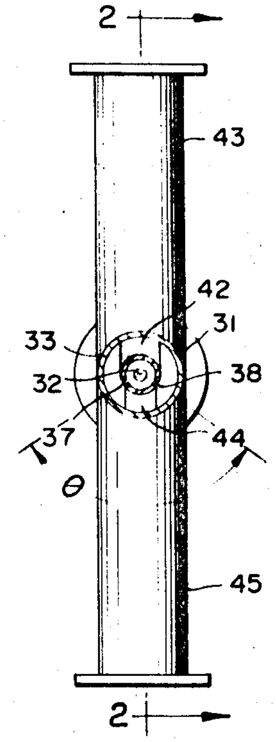
FIG. 3 is a view through section 3—3 of FIG. 2.

Referring to FIG. 2, there is shown a view through sections 2—2 of FIG. 3 showing a coaxial structure according to the invention representing a modification of the coaxial hybrid of the type described in Alford U.S. Patent No. 2,769,146. Since this structure largely comprises coaxial conducting elements, the views in FIGS. 2 and 3 best and fully illustrate this embodiment of the invention.

Corresponding elements throughout the drawing are identified by the same reference symbol. The structure in plan view is of cross-shaped section with the four transformers 14, 17, 23 and 26 intersecting in junction 11. Series branch 12 comprises the larger diameter inner conductor 13 and outer conductor 31 to form a 50 ohm coaxial transmission line. S transformer 14 comprises inner conductor 32 and intermediate conductor 33 forming a coaxial transmission line of characteristic impedance of substantially 75.2 ohms. Intermediate conductor 33 is connected to outer conductor 31 at its series branch end by an annular conducting element 34 formed with a bevelled inner surface 35 that helps to lessen reflections resulting from the discontinuous change in diameter between the series branch and the S transformer 14. The junction end of inner conductor 32 is connected to the branch II side of intermediate conductor 33 at a point 36. Point 36 embraces the common axis of the side branches 21 and 24 and the side branch transformers 23 and 26 above lower longitudinal slot 37 and below upper longitudinal slot 38 whose projection is superimposed upon slot 37, as best seen in FIG. 2. The effective electrical length of intermediate conductor 33 is of the order of a half wavelength. Its parallel branch end is connected to the end of inner conductor 16 of parallel branch 15. Outer conductor 41 comprises the outer conductor of both the 50 ohm coaxial transmission line of P branch 15 and of the 37.6 ohm coaxial transmission line of P transformer 17 comprising intermediate conductor 38 as the inner conductor of the latter line. The slots 37 and 38 are then also of the order of a half wavelength.

The side branch transformer I23 comprises an inner conductor 42 connected inside junction 11 to the intermediate conductor 33 midway between the ends of intermediate conductor 33 as shown and opposite point 36 where inner conductor 32 is connected to the inside wall of intermediate conductor 33. Outer conductor 43 functions as both the outer conductor of the coaxial line comprising side branch I transformer 23 with a characteristic impedance of substantially 42.04 ohms and the outer conductor of side branch I with inner conductor 22 comprising a coaxial transmission line of characteristic impedance substantially 50 ohms.

Inner conductor 44 of side branch II transformer 26 is connected inside junction 11 to the outside wall of intermediate conductor 33 opposite point 36. Outer conductor 45 comprises the outer conductor of the coaxial transmission line of transformer II26 of characteristic impedance substantially 84.08 ohms and of side branch II coaxial transmission line of substantially 50 ohms.

Referring to FIG. 3, there is shown a view through section 3—3 of FIG. 2 illustrating the angle $\theta$ subtended by upper slot 38 and lower slot 37. This angle equals $360°/(n+l)$ where $n$ is the ratio of the power delivered to the side branch further from the slots to that delivered to the side branch nearer to the slots. Thus, in the specific example where $n$ equals 4, this angle $\theta$ is 72 degrees as shown.

An experimental model of the type illustrated in FIGS. 2 and 3 has been built with excellent results set forth as follows:

Frequency range—406–450 mHz.
Power split—4 to 1
Input VSWR—1.05 or less, Branch P; 1.6 or less, Branch S.
Minimum isolation—30 db, Branches P–S; 20 db, Branches I–II The angle $\theta$ is selected so that the current density about the circumference of the intermediate conductor is substantially constant. This results in there being no voltage developed across the slots and effective isolation between series and parallel branches. To achieve this substantially uniform current density, the ratio of the larger angular sector to the smaller angular sector subtended by the slots is the same as the desired power division. Thus, the larger and smaller angular sectors in the specific example are 288° and 72°, respectively, to achieve the ratio of power division of four.

Although the specific example described herein is with respect to coaxial hybrid, the principles of the invention are applicable to other networks exhibiting hybrid characteristics, such as those described in the aforesaid Alford Manufacturing Company catalog, and hybrids described in other patents and publications.

It is evident that those skilled in the art may now make numerous uses and modifications of and departures from the specific embodiments described herein without departing from the invention concepts. Consequently, the invention is to be construed as embracing each and every novel feature and novel combination of features present in or possessed by the apparatus and techniques disclosed herein and limited solely by the spirit and scope of the appended claims.

The embodiments of the invention in which an exclusive property or privilege is claimed, are defined as follows:

1. Unequal power dividing apparatus comprising,
junction defining means,
a series branch,
a parallel branch,
first and second side branches,
said series branch coupled to said junction by series branch transforming means coupling said series branch to said junction for matching the impedance of said series branch to that presented by said junction,
parallel branch transforming means coupling said parallel branch to said junction for matching the impedance of said parallel branch to that presented by said junction,
means including first and second side branch transforming means coupling said first and second side branches respectively to said junction for matching the impedances of said first and second side branches respectively to that presented by said junction while maintaining a high degree of isolation between said first and second side branches,
the impedance presented by said junction to said first side branch transforming means being different from that presented by said junction to said second side branch transforming means,
said branches and said transforming means coacting to establish effective isolation between said side branches and between said series and parallel branches when said branches are terminated in their respective characteristic impedances.

2. Unequal power dividing apparatus in accordance with claim 1 wherein each of said branches comprise coaxial branches.

3. Unequal power dividing apparatus in accordance with claim 2 and further comprising means for establishing substantially equal magnitude potentials substantially at the ends of said side branch transforming means nearest to said junction.

4. Unequal power dividing apparatus in accordance with claim 3 wherein each of said transforming means comprises a transmission line that is an odd number of quarter wavelengths in effective electrical length.

5. Unequal power dividing apparatus in accordance with claim 4 wherein said series branch transforming means comprises a coaxial transmission line having an inner conductor coaxial with a surrounding intermediate conductor and coupled thereto at the end thereof nearest said junction at a coupling point on said intermediate conductor,
said intermediate conductor being substantially an even number of quarter wavelengths in effective electrical length and having a pair of longitudinal slots that extend for most of the length thereof, said parallel branch transforming means comprising said intermediate conductor functioning as the inner conductor of a coaxial transmission line contiguous with the coaxial parallel branch and an outer conductor.

6. Unequal power dividing apparatus in accordance with claim 5 wherein said first and second side branch transforming means comprise first and second coaxial transmission lines contiguous with said first and second side branches respectively of characteristic impedance ratio proportional substantially to the square root of the ratio $n$ of division between said first and second side branches of power applied to said series and parallel branches when said side branches are terminated in their respective characteristic impedances.

7. Unequal power dividing apparatus in accordance with claim 6 wherein the angular displacement in said intermediate conductor between said longitudinal slots is substantially $2\pi/n+1$ where $n$ is said ratio.

8. Unequal power dividing apparatus in accordance with claim 7 wherein said coupling point is substantially midway between said slots.

9. Unequal power dividing apparatus in accordance with claim 8 wherein said series branch, said series branch transforming means, said parallel branch and said parallel branch transforming means are axially displaced along a first common axis, and said side branches and said side branch transformers are axially displaced along a second common axis that substantially intersects and is substantially orthogonal to said first common axis.

References Cited

UNITED STATES PATENTS

| | | | |
|---|---|---|---|
| 2,424,156 | 7/1947 | Espley | 333—11 X |
| 2,602,856 | 7/1952 | Rumsey | 333—9 |
| 2,769,146 | 10/1956 | Alford | 333—11 |

HERMAN KARL SAALBACH, Primary Examiner

P. L. GENSLER, Assistant Examiner

U.S. Cl. X.R.

333—11

UNITED STATES PATENT OFFICE
CERTIFICATE OF CORRECTION

Patent No. 3,467,919 September 16, 1969

Harold H. Leach et al.

It is certified that error appears in the above identified patent and that said Letters Patent are hereby corrected as shown below:

Column 1, line 27, "(nl)" should read -- (n+1) --. Column 2, line 8, "appartus" should read -- apparatus --. Column 3, line 56, "$\sqrt{}nZ_{oI}/\sqrt{}n+1$" should read -- $\sqrt{n}Z_{o1}/\sqrt{n+1}$ --. Column 5, line 36, "360°/(n+ℓ)" should read -- 360°/n+1 --.

Signed and sealed this 27th day of October 1970.

(SEAL)
Attest:

Edward M. Fletcher, Jr.
Attesting Officer

WILLIAM E. SCHUYLER, JR.
Commissioner of Patents